(12) United States Patent
Lacoss-Arnold

(10) Patent No.: US 12,423,699 B2
(45) Date of Patent: *Sep. 23, 2025

(54) SYSTEMS AND METHODS FOR PRE-AUTHENTICATING A USER OF A PAYMENT CARD OVER A NETWORK

(71) Applicant: MASTERCARD INTERNATIONAL INCORPORATED, Purchase, NY (US)

(72) Inventor: Jason Jay Lacoss-Arnold, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 17/878,732

(22) Filed: Aug. 1, 2022

(65) Prior Publication Data

US 2022/0366419 A1 Nov. 17, 2022

Related U.S. Application Data

(63) Continuation of application No. 15/397,323, filed on Jan. 3, 2017, now Pat. No. 11,403,637.

(51) Int. Cl.
*G06Q 40/00* (2023.01)
*G06Q 20/32* (2012.01)
(Continued)

(52) U.S. Cl.
CPC ..... *G06Q 20/4014* (2013.01); *G06Q 20/3223* (2013.01); *G06Q 20/3674* (2013.01); *G06Q 20/425* (2013.01)

(58) Field of Classification Search
None
See application file for complete search history.

(56) References Cited

U.S. PATENT DOCUMENTS

| 6,513,015 B2 | 1/2003 | Ogasawara |
| 8,135,624 B1 | 3/2012 | Ramalingam et al. |
| (Continued) | | |

OTHER PUBLICATIONS

"Card-Not-Present Fraud Working Committee White Paper: Near-Term Solutions to Address the Growing Threat of Card-Not-Present Fraud" EMV Connection, Apr. 2015, https://emv-connection.com/wp-content/uploads/2015/04/CNP-Solutions-White-Paper_FINAL.pdf. (Year: 2015), 36 pages.

*Primary Examiner* — Olabode Akintola
(74) *Attorney, Agent, or Firm* — Armstrong Teasdale LLP

(57) ABSTRACT

The present disclosure provides for systems and methods for pre-authenticating a user over a network, the system including an authentication computing device configured to receive, over a first computer network, a pre-authentication signal from a client device, determine an account number associated with a payment card of the user, verify i) that the user has satisfied at least one security measure, and ii) that the account number is associated with the client device, store the account number in association with a timer, initiate the timer, monitor, until the timer expires, a second computer network to detect an authorization request message for a transaction having the account number, and embed a digital authentication flag in the authorization request message when the authorization request message is detected before the timer expires, the digital authentication flag indicating that the transaction has been pre-authenticated.

20 Claims, 6 Drawing Sheets

(51) Int. Cl.
    *G06Q 20/36*    (2012.01)
    *G06Q 20/40*    (2012.01)
    *G06Q 20/42*    (2012.01)

(56) References Cited

U.S. PATENT DOCUMENTS

| | | | |
|---|---|---|---|
| 8,140,403 B2 | 3/2012 | Ramalingam et al. | |
| 8,255,284 B1 | 8/2012 | Ramalingam et al. | |
| 8,341,029 B1 | 12/2012 | Ramalingam et al. | |
| 8,352,315 B2 | 1/2013 | Faith et al. | |
| 8,538,819 B2* | 9/2013 | Murphy | G06Q 20/40 705/16 |
| 8,682,802 B1* | 3/2014 | Kannanari | G06Q 20/3274 705/64 |
| 10,121,141 B1* | 11/2018 | Belleville | G06Q 20/3672 |
| 2008/0235144 A1* | 9/2008 | Phillips | G06Q 20/367 705/67 |
| 2010/0276484 A1* | 11/2010 | Banerjee | G06Q 30/06 235/379 |
| 2011/0184857 A1* | 7/2011 | Shakkarwar | G06Q 20/10 705/39 |
| 2011/0320291 A1 | 12/2011 | Coon | |
| 2011/0320354 A1 | 12/2011 | Coon | |
| 2012/0197740 A1* | 8/2012 | Grigg | G06Q 20/3278 705/16 |
| 2014/0006190 A1 | 1/2014 | Loomis, III et al. | |
| 2014/0025576 A1 | 1/2014 | Esch | |
| 2014/0074705 A1* | 3/2014 | Kimberg | G06Q 20/10 705/42 |
| 2014/0164241 A1* | 6/2014 | Neuwirth | G06Q 20/12 705/44 |
| 2014/0279521 A1* | 9/2014 | Van den Broeck | G06Q 20/4016 705/44 |
| 2015/0052044 A1 | 2/2015 | Castagna et al. | |
| 2015/0213443 A1* | 7/2015 | Geffon | G06Q 20/3821 705/76 |
| 2015/0317748 A1* | 11/2015 | Roberts | G06Q 20/34 705/30 |
| 2015/0332383 A1 | 11/2015 | Ragan et al. | |
| 2016/0035006 A1 | 2/2016 | Ragan et al. | |
| 2016/0125415 A1* | 5/2016 | Mardikar | G06Q 20/40145 705/44 |

* cited by examiner

SYSTEMS AND METHODS FOR PRE-AUTHENTICATING A USER OF A PAYMENT CARD OVER A NETWORK

CROSS REFERENCE TO RELATED APPLICATIONS

This application is a continuation of, and claims priority to, U.S. application Ser. No. 15/397,323, filed Jan. 3, 2017, and entitled "SYSTEMS AND METHODS FOR PRE-AUTHENTICATING A USER OF A PAYMENT CARD OVER A NETWORK," the entire contents of which are hereby incorporated herein by reference.

BACKGROUND

The field of the disclosure relates generally to pre-authenticating a user over a network, and more particularly, to methods and systems for authenticating a user of a payment card using a pre-authentication service processed over a first computer network for a payment transaction being processed over a second computing network.

Card issuers have popularized the digitalization of physical payment cards by providing easy and secure ways to provide payment information to a merchant. Many cardholders use digital wallet devices to store payment information and make payment transactions both within a store via (i) a smart phone or other user computing device and/or (ii) over the Internet through a merchant website. These digital wallet devices that allow for in-store or online purchases offer additional security that protects against card theft and fraud as compared to using a physical card. For example, in some cases, card issuers may provide tokenized digital enablement services to map actual account information with specific tokenized transaction data to improve security of such digital payment transactions. In other words, the tokenized data is stored within the user device and is provided to the merchant for later mapping to actual account data so that the actual account data is better protected against theft.

Unfortunately, many merchants have not yet adopted the technology to support these digital payment transactions that include using such digital enablement services. Rather, these merchants utilize POS devices that are only able to accept payment cards having magnetic stripes that are swiped through the POS device. These merchants, sometimes referred to as "simple" merchants, may not have the funds to upgrade their point-of-sale devices or other computing equipment to facilitate these digital transactions. Therefore, there is a need for a system that allows these simple merchants to provide the increased security of digital payment transactions that use digital enablement services without having to incur the expenses of adding or upgrading company equipment to accept such digital payment transactions.

BRIEF DESCRIPTION

In one aspect, the present disclosure provides a system for pre-authenticating a user over a network. The system includes an authentication computing device configured to receive, over a first computer network, a pre-authentication signal from a client device operated by the user, determine, from the pre-authentication signal, an account number associated with a payment card of the user, verify, based on the pre-authentication signal, i) that the user has satisfied at least one security measure, and ii) that the account number is associated with the client device, store the account number in a monitor data store, the account number stored in association with a timer that expires after a predetermined length of time, initiate the timer, monitor, until the timer expires, a second computer network to detect an authorization request message for a transaction having the account number, and embed a digital authentication flag in the authorization request message when the authorization request message is detected before the timer expires, the digital authentication flag indicating that the transaction has been pre-authenticated.

In another aspect, the present disclosure provides an authentication computing device for pre-authenticating a user over a network. The authentication computing device includes a monitor data store, and a monitoring module in communication with the monitor data store. The monitoring module is configured to receive, over a first computer network, a pre-authentication signal from a client device operated by the user, determine, from the pre-authentication signal, an account number associated with a payment card of the user, verify, based on the pre-authentication signal, i) that the user has satisfied at least one security measure, and ii) that the account number is associated with the client device, store the account number in the monitor data store, the account number stored in association with a timer that expires after a predetermined length of time, initiate the timer, monitor, until the timer expires, a second computer network to detect an authorization request message for a transaction having the account number, and embed a digital authentication flag in the authorization request message when the authorization request message is detected before the timer expires, the digital authentication flag indicating that the transaction has been pre-authenticated.

In yet another aspect, the present disclosure provides a method for pre-authenticating a user over a network using an authentication computing device. The method includes receiving, over a first computer network, a pre-authentication signal from a client device operated by the user, determining, from the pre-authentication signal, an account number associated with a payment card of the user, verifying, based on the pre-authentication signal, i) that the user has satisfied at least one security measure, and ii) that the account number is associated with the client device, storing the account number in a monitor data store, the account number stored in association with a timer that expires after a predetermined length of time, initiating the timer, monitoring, until the timer expires, a second computer network to detect an authorization request message for a transaction having the account number, and embedding a digital authentication flag in the authorization request message when the authorization request message is detected before the timer expires, the digital authentication flag indicating that the transaction has been pre-authenticated.

DETAILED DESCRIPTION

Figure 1:
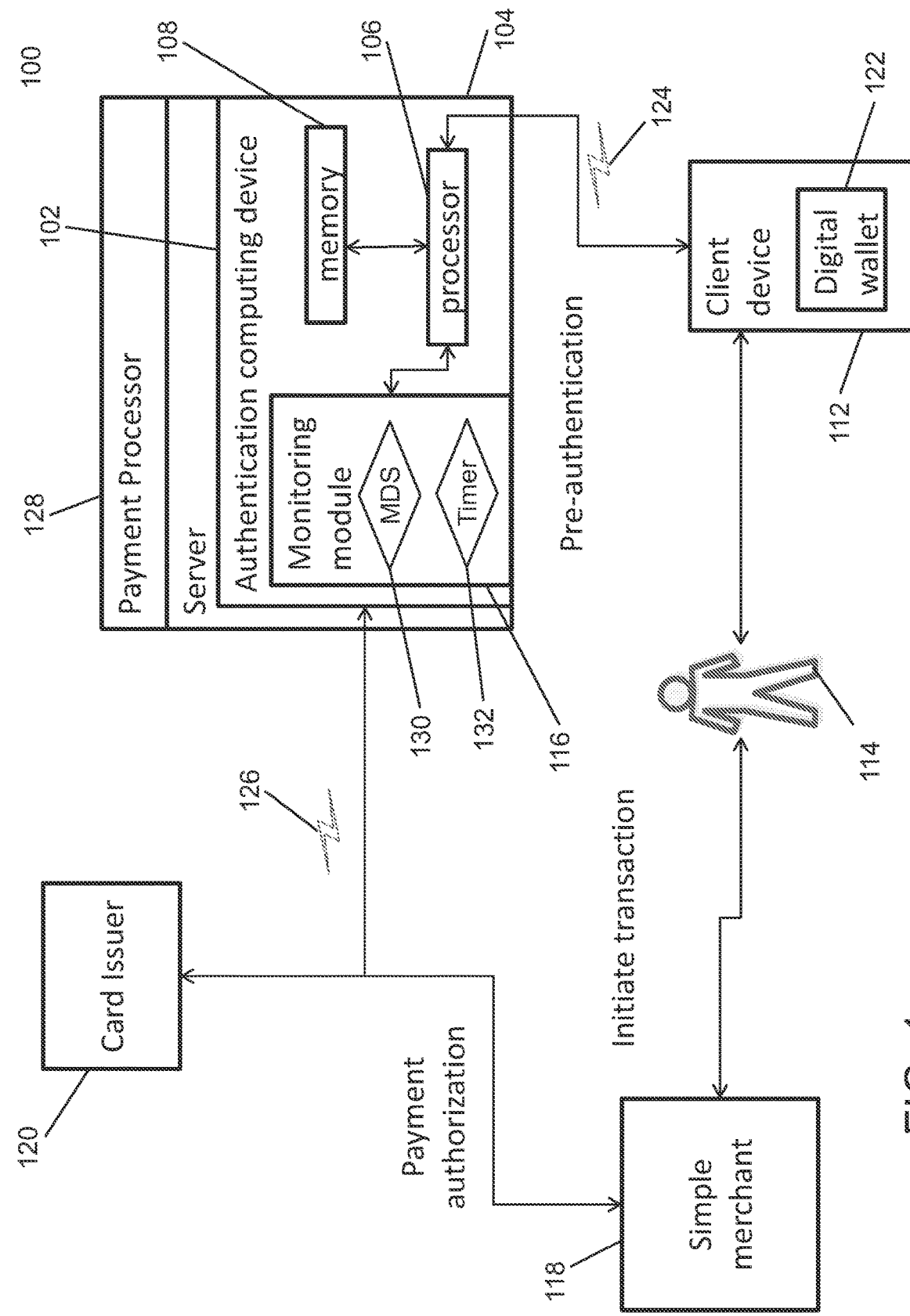
FIG. 1 shows a diagram of an example embodiment of a pre-authentication system for pre-authenticating a user of a payment card initiating a payment transaction over a network.

The disclosure describes systems and methods that are configured to provide a two factor pre-authentication of a user (e.g., cardholder) using a payment card to initiate a payment transaction with a merchant. The system enables the cardholder to make a secure payment transaction using digital enablement (DE) services with a merchant who does not have the technology or equipment to process a digital payment transaction. The cardholder does this by communicating with an authentication computing device over a first computer network (e.g., communication channel) using a digital wallet included within a client device. The cardholder sends a signal to the authentication computing device using the client device, wherein the authentication computing device verifies that the cardholder has satisfied certain security measures (e.g., biometrics) and verifies that the provided account number is associated with the client device before the payment card is used for the payment transaction.

In the example embodiment, after performing the authentication, the authentication computing device stores the associated account number in a monitor data store along with a timer that tracks a length of time the authentication computing device monitors a payment network for a transaction using the stored account number. The length of time is a predetermined length of time (e.g., 5 minutes). If the authentication computing device detects a transaction being processed over a second computer network (e.g., a payment network) that includes the account number being monitored and it is detected within the timer window, then the authentication computing device embeds a digital authentication flag in an authorization request message associated with the payment transaction advising at least one of the issuer, the merchant, and the acquirer that the transaction has been pre-authenticated using a digital authentication process.

The pre-authentication system includes an authentication computing device, a payment processor associated with a payment network, a merchant computing device (e.g., either a merchant website for online transactions or a merchant point-of-sale (POS) device for POS transactions), a user computing device that includes a digital wallet app stored thereon, and an issuer computing device.

In the example embodiment, the merchant is a "simple" merchant. A simple merchant is defined as a merchant who does not have the payment processing equipment to accommodate a DE payment transaction. A DE payment transaction is a payment transaction that uses a connected electronic device (e.g., a user device) to provide payment credentials and payment data to a merchant computing device to initiate a payment transaction with the merchant. In some cases, DE technology may use token IDs, wherein token IDs are tokenized account numbers that electronic devices use in place of actual account numbers for security purposes. The token ID provides an extra layer of security by linking the token ID to a specific electronic device. The DE technology validates a transaction by mapping a token ID to a primary account number (PAN) associated with a cardholder account, and forwards it to a card issuer for a payment authorization. If the token ID does not match up with the cardholder account information, the DE technology blocks the transaction. An example of a DE technology is the MasterCard Digital Enablement Service.

A client device is any electronic device configured to initiate a payment transaction over a payment network. The client device is any type of mobile computing device suitable for performing the functions as disclosed herein, including, but not limited to, a cellular phone, a smartphone, a tablet computer, a laptop computer, a digital music player, a key fob, a proximity payment card, and/or a smart watch (or other wearable device). In some embodiments, the client device includes a secure element (not shown) that is tamper-resistant and configured for securely storing data. In other embodiments, the secure element is a hardware chip or chipset, and may store one or more cryptographic keys. The cryptographic keys may be provisioned to the secure element at the time of the manufacture of the client device, or via an over-the-air (OTA) provisioning method controlled by, for example, a payment card account issuer financial institution (FI).

The client device is further configured to support a digital wallet system for making electronic payments. In the example embodiment, the digital wallet system is a payment application that has a software component and an information component. In the example embodiment, the digital wallet system is a software application that is configured to be downloaded on a client device including a smartphone or a desktop computer. Other digital wallet systems suitable for making a wireless payment may be used in alternate embodiments of the disclosure.

In order to use the digital wallet system, the cardholder must register by providing account information to the digital wallet system. Account information and device metadata are captured during the registration process for the digital wallet. The account data captured may include, but is not limited to, a name, an address, an account number, a loyalty card number, shipping address, billing address, and/or a bank account number. The metadata may include a device ID, a MAC address, an IP address, a digital wallet ID, and other device related data. Once registered, the cardholder is able to use the digital wallet system each time the cardholder wants to make a purchase with a merchant. This is beneficial to the cardholder and the merchant because it provides a speedier and more secure payment transaction between the two.

The authentication computing device includes a processor, a memory, and a monitoring module that includes a monitor data store, a timer and a monitoring component for monitoring account numbers within payment transactions. The memory is configured to store digital wallet registration data including account data and device metadata. The monitor data store may also be included within the memory or may be a separate memory device. The processor is configured to send and receive signals to and from at least one of the client device, the issuer computing device, and the payment processor, wherein the signal includes a token ID, a PAN, and/or device metadata. The processor is further configured to process the signal and map the token ID and/or metadata to the appropriate cardholder account information for security verification.

The monitoring module is configured to track and monitor payment transactions that are made within the pre-determined amount of time. The monitoring module is further configured to monitor processing payment transactions for the account number associated with the signal when the security verification is completed for the pre-determined period of time. The account number stays "flagged" or stored in the monitor data store until the pre-determined amount of time ends, wherein the account number is no longer flagged or stored in the monitor data store until another pre authentication signal is sent from the client device to the authentication computing device and security verification is performed. In the example embodiment, the pre-determined amount of time is five minutes. In another embodiment, the pre-determined amount of time is more than five minutes. In yet another embodiment, the pre-determined amount of time is less than five minutes. In another embodiment, as described below, the pre-determined amount of time is several days.

For online (e.g., non-POS device) transactions where the merchant requires time to ship the product, the predetermined period may be longer. For example, for making a purchase with an online merchant who requires multiple days for shipping, the pre-determined period is set for one week until it expires. In another embodiment, the pre-determined period of time may be set by the cardholder. The cardholder may do so by accessing the digital wallet and selecting the pre-determined period through a set of settings or parameters.

The authentication computing device is stored and managed within a server system (server). In the example embodiment, the payment processor and the authentication computing device are part of the same server device or set of servers. In other embodiments, the authentication computing device is separate from the payment processor device, but the two devices are in communication with one another.

In the embodiments described herein, the cardholder uses the client device to access the digital wallet app in order to initiate the two factor authentication process. The two factor authentication process utilizes the digital wallet to send an authentication signal to the authentication computing device over a first communication network (Internet, cellular network, etc.), or first computer network. The two factor authentication method includes a two-step verification that provides an extra layer of security by requiring a password/username and a piece of information that only the user can provide, such as a biometric (e.g., fingerprint, iris scan, selfie picture, etc.) as the first authentication step. The authentication computing device is further configured to store account data, device metadata, and biometric data (sample biometric data) when the cardholder registers and downloads the digital wallet to the user device, which is used for the second step of authentication.

In the example embodiment, the cardholder initiates a payment transaction with a simple merchant. Because the cardholder's digital wallet cannot be used with the simple merchant, the cardholder must initiate the payment transaction with a physical payment card. However, the cardholder may want to take advantage of using the two factor pre-authentication process or may be required to use the pre-authentication process by certain controls that may be applied to the account by either the issuer or the payment processor. In either event, the cardholder initiates the pre-authentication process by accessing the digital wallet on their client device. This may include inputting a password or biometric data to access the digital wallet. By so doing, the cardholder initially authenticates themselves to the client device by inputting said password or biometrics.

Once the cardholder has accessed the digital wallet app, the cardholder selects a virtual button within the digital wallet which causes an authentication message to be sent over the first computer or communication network to the authentication computing device. The authentication computing device then performs the authentication process. The authentication message includes an account number or token ID, device metadata, and biometric data. If the token ID/account number and/or the device metadata match the stored account information from registration, and the biometric data matching is confirmed (either by the client device or the authentication computing device), then the pre-authentication process is completed, and a message is sent back to the cardholder's client device confirming that the authentication has been completed. If the token ID/account number and/or the device metadata do not match the stored data, then authentication is denied and any subsequent payment transactions with this account number may also be denied.

The authentication computing device, and more specifically, the monitoring module stores the account number in the monitor data store along with a timer, and monitors payment transactions being processed over the payment network for the predetermined amount of time.

Once the cardholder receives the message that the pre-authentication has been completed, the cardholder initiates the payment transaction with the simple merchant by swiping the payment card at the POS device or otherwise providing the account number to the merchant. When the transaction takes place online, the cardholder may enter in a card number in the appropriate form. The merchant then sends the transaction information (e.g., authorization request message) over the payment network to the payment processor and eventually to the card issuer for authorization.

The monitoring module is in communication with the payment processor so that the monitoring module is able to monitor payment transactions as they are processed over the payment network. Thus, in the example embodiment, the monitoring module is configured to monitor active payment transactions being processed over the payment network, and identify transactions using the account data associated with the pre-authentications process. More specifically, the monitoring module monitors payment transactions being processed over the payment network for a payment transaction that includes the account number associated with the pre-authentication process, which is stored in the monitor data store.

When the monitoring module identifies such a payment transaction (e.g., a pre-authenticated payment transaction), the monitoring module compares the account number included in the authorization request message (e.g., ISO 8583 message) of the pre-authenticated payment transaction to the account number stored within the monitor data store. If there is a match, the monitoring module then performs a lookup within the monitor data store to see if the elapsed time on the timer is within the predetermined period of time. If so, the monitoring module embeds a digital authentication flag within a data field of the authorization request message to create an enhanced authorization request message. The enhanced authorization request message is then transmitted to the issuer computing device for further processing and approval.

In some embodiments, the monitoring module is also configured to provide the pre-authentication indicator, such as a digital authentication flag to the merchant or the acquirer computing device. Thus, the fact that this particular account number has been pre-authenticated using DE technology can be factored into any fraud scoring processes used by any of the issuer, the merchant and/or the acquirer for purposes of determining whether to authorize the transaction. In some embodiments, the pre-authentication may also cause the issuer, the merchant and/or the acquirer to forgo any further fraud evaluation, and rather, just approve the transaction. By so doing, the speed and efficiency of the overall payment network is greatly improved because the pre-authentication, which is performed over a separate network, is used for eliminating or reducing steps that may otherwise be performed on the payment network. Although pre-authentication and monitoring of a single payment transaction is described herein, it should be understood that the system described herein is configured to pre-authenticate and monitor for a plurality of account numbers and a plurality of payment transactions.

In the example embodiment, the systems and methods disclosed herein allow a user or cardholder who has a client device to securely purchase goods or services from a merchant who does not support digital enablement system technology. The user registers the client device with the DE service. Further embodiments of the DE service include a mobile cloud server computer operably connected to a mapping database and to a credential management server computer. The credential management server computer may also be operably connected to a token database and a keys database. In order to enroll the client device with the DE service, the user utilizes a digital wallet application residing on the client device to transmit the user's primary account number (PAN), billing address, and security information (such as a CVC2 code) via a Mobile Network Operator (MNO) to the digital enablement service for validation. In some implementations, when the digital enablement service receives the registration request from the mobile device via the MNO, the mobile cloud server determines which issuer issued the mobile payment account to the user, and then transmits the PAN information to that server system for validation, In some cases, the DE service may be configured to perform cardholder validation on behalf of the issuer. Accordingly, when the mobile cloud server receives a validation indication regarding user's account from the user's issuer, a token (or client device PAN) and a card key are then created and transmitted to the wallet credential management server (or, in an alternate embodiment, to a trusted service manager (TSM)). The token and single use and/or session keys (derived from the card key) are then transmitted (either by the digital enablement service or the TSM) to the wallet application which is running on the user's client device. In some implementations, the user may be required to activate the simulated magnetic stripe payment card account by, for example, responding to a text message from the issuer to confirm registration or enrollment.

As mentioned above, for online purchases, the pre-determined amount of time can be set to a longer period of time to allow the cardholder more time to make the purchase. For example, the cardholder may set the pre-determined amount of time to one or two weeks. In some embodiments, the pre-determined amount of time automatically defaults to a longer time for purchases made online. The cardholder is allowed to set the pre-determine period of time by using a user interface on a client device.

In one embodiment, the system is configured so that a cardholder is able to set security parameters on the account associated with the digital wallet device or system. The digital wallet parameters are able to be set by the cardholder on a website or application associated with the digital wallet system. Such parameters serve to restrict the approval of payment transactions occurring outside said parameters. Parameters include, but are not limited to, location, payment amount, time of payment, and or number of payments. This allows the cardholder to exercise control of various factors of a payment, therefore increasing security of the card account's use.

For example, if a user sets the location parameter to restrict payment only to purchases made within the United States, the card issuer will decline any payments made from the card outside the United States. Moreover, if a cardholder restricts payment to no more than 100 dollars, the card issuer will automatically decline the payment if it exceeds 100 dollars.

In another embodiment, the authentication computing device is able to detect geolocation data. In this embodiment, the authentication computing device receives geolocation data associated with the cardholder's location at the time of the pre-authentication (e.g., the zip code of the simple merchant store location). The geolocation data is included within the pre-authentication signal sent from the digital wallet system, and is stored within the monitor data store. Geolocation data includes a plurality of data defined by a location. In some embodiments, a geolocation is defined by a zip code. The cardholder may set parameters based upon geolocation data to restrict payment to specific locations. In the case where geolocation data is provided, the authentication process may also include a lookup by the authentication computing device to determine the location of the merchant involved in the transaction, and then a comparison of the registered location of the merchant to the geolocation of the user computing device. If there is a match, then authentication is further confirmed.

The present disclosure further includes a payment card system, such as a credit card payment system using the MasterCard® payment card system payment network (also referred to as an "interchange" or "interchange network"). The MasterCard® payment card system payment network is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, New York).

In the payment card system, a financial institution such as an issuer issues a payment card for an account, such as a credit card account or a debit card account, to a cardholder, who uses the payment card to tender payment for a purchase from a merchant. To accept payment with the payment card, the merchant must normally establish an account with a financial institution that is part of the financial payment system. This financial institution is usually called the "merchant bank" or the "acquiring bank" or "acquirer bank" or simply "acquirer". When a cardholder tenders payment for a purchase with a payment card (also known as a financial transaction card), the merchant requests authorization from an acquirer for the amount of the purchase. Such a request is referred to herein as an authorization request message. The request may be performed over the telephone, but is usually performed through the use of a point-of-interaction terminal, also referred to herein as a point-of-sale device, which reads the cardholder's account information from the magnetic stripe on the payment card and communicates electronically with the transaction processing computers of the acquirer. Alternatively, the acquirer may authorize a third party to perform transaction processing on its behalf. In this case, the point-of-interaction terminal will be configured to communicate with the third party. Such a third party is usually called a "merchant processor" or an "acquiring processor."

Using the payment card system payment network, the computers of the acquirer or the merchant processor will communicate with the computers of the issuer, such as the issuer computing device, to determine whether the cardholder's account is in good standing and whether the purchase is covered by the cardholder's available credit line or account balance. Based on these determinations, the request for authorization will be declined or accepted. If the request is accepted, an authorization code is issued to the merchant.

When a request for authorization is accepted, the available credit line or available balance of the cardholder's account is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For debit card transactions, when a request for authorization is approved by the issuer, the cardholder's account is decreased. Normally, a charge is posted immediately to the cardholder's account. The bankcard association then transmits the approval to the acquiring processor for distribution of goods/services, or information or cash in the case of an ATM.

After a transaction is captured, the transaction is settled between the merchant, the acquirer, and the issuer. Settlement refers to the transfer of financial data or funds between the merchant's account, the acquirer, and the issuer related to the transaction. Usually, transactions are captured and accumulated into a "batch," which is settled as a group.

The system also provides tracking and reporting information regarding completed transactions and/or terminated transactions. Transaction information can be obtained from the client device, stored at the server system, and communicated to the user for recordkeeping purposes, for example. The system may be used for commercial purposes, or for residential purposes.

In one embodiment, the system inhibits fraudulent purchases by requiring specific pieces of information to be included in a transaction approval request message (e.g., authorization message) sent from the client device. The required information includes user account data and a registered PAN in order to approve purchase transactions. Transactions can also be restricted to those associated with specific location data to reduce fraud.

The methods and systems described herein facilitate secure payment transactions between a cardholder and a merchant using a payment card, and operate to increase approval rates for card issuers. In addition, simple merchants will be able to increase payment integrity of in store and online purchases without the need to adopt the technology of a digital enablement system. The systems and methods disclosed herein also solve the technical problem of how to utilize contactless payment devices or proximity payment devices (particularly consumer mobile devices that include payment circuitry, such as smartphones and/or tablet computers), herein referred to as client devices, to help conduct secure transactions while utilizing magnetic stripe technology in a manner that does not require significant changes to legacy systems. Thus, the methods and systems disclosed herein use a digital wallet stored on a client device to initiate a two-factor pre-authentication for securing a payment transaction, and, after completing the pre-authentication, initiating the payment with a swipe of a payment card, which is then identified and flagged as being pre-authenticated while being processed over the payment network. For example, a cardholder can utilize his or her payment-enabled smartphone to conduct a purchase transaction at a merchant retail location by sending a pre-authentication signal to the payment processor, even when the merchant is a simple merchant.

FIG. 1 shows a diagram of an example embodiment of a pre-authentication system 100 for pre-authenticating a user of a payment card initiating a payment transaction over a POS device. System 100 includes a server 102 used as a payment processor 128. Server 102 may further include an authentication computing device 104 with a monitoring module 116 that stores a pre-authenticated account number (e.g., payment card account number) in a monitor data store 130 along with a timer 132 that tracks a length of time the authentication computing device 104 monitors a second computer network 126 (a payment network) for a transaction using the pre-authenticated account number. The length of time is a predetermined length of time (e.g., 5 minutes). Although monitoring module 116 is shown as part of payment processor 128, it should be understood that these devices could be separate computing devices.

Authentication computing device 104 further includes a processor 106 and a memory 108, wherein memory 108 is configured to store digital wallet registration data including account data and device metadata. Monitor data store 130 could be part of memory 108 or separate from memory 108. Processor 106 is configured to send and receive signals to and from at least one of a client device 112, an issuer computing device 120, and payment processor 128, wherein the signal includes a token ID, a PAN, and/or device metadata. Processor 106 is further configured to process the signal and map the token ID and/or metadata to the appropriate cardholder 114 account information for security verification. Authentication computing device 104 ensures the security of card payments by verifying that the token ID and/or meta data and/or biometric data matches with the associated card account information.

System 100 further includes at least one client device 112 with access to a digital wallet 122. Digital wallet 122 stores and processes cardholder 114 and card account information such as, but not limited to, device metadata, biometric data, and/or a card account number. In the example embodiment, digital wallet 122 is a software application that stores card payment data, wherein client device 112 is a mobile device or a non-mobile electronic device and is configured to access digital wallet 122 application software.

Cardholder 114 initially registers for digital wallet 122 by inputting registration information into digital wallet 122 application. Registration information includes, but is not limited to, a card account number associated with a payment card, a bank account number, a name, a billing address, and/or a shipping address. Cardholder 114 registers by accessing digital wallet 122 and filling out registration forms.

In an embodiment where payment processor 128 manages digital wallet 122, payment processor 128 issues a token ID associated with client device 112 and a PAN associated with a payment card. The token ID is a substitute for sensitive information that can potentially be used for payment fraud. Digital wallet 122 is further configured to be accessed by cardholder 114 by way of a password or a PIN code, and then by a biometric piece of information, such as but not limited to, fingerprints.

Digital wallet 122 further includes a virtual button (not shown) configured to, once used, send a signal to server 102 over a first computer network 124 for a pre-authentication of the card account number stored within digital wallet 122. In the example embodiment, the virtual button is a prompt within digital wallet 122 that, when activated/pressed by cardholder 114, causes the pre-authentication signal to be sent from client device 112 to authentication computing device 104.

Authentication computing device 104 receives a signal with the token ID and maps the token ID/PAN/device metadata to the associated account number stored in monitor data store 130 using processor 106. Processor 106 further matches card account information with device ID, merchant location, time, date, and payment amount stored within monitor data store 130.

Monitoring module 116 is configured to track and monitor payment transactions that are made within the pre-determined amount of time. The account number is "flagged" during this time and stored within monitor data store 130. Cardholder 114 is then able to make a purchase using the payment account until the pre-determined amount of time expires. This ensures that only cardholder 114 who has recently requested pre-authentication of a card is able to be approved for a payment transaction. If cardholder 114 decides not to initiate the payment transaction after the payment account has been pre-authenticated, the flag will expire after the pre-determined amount of time as elapsed. For example, if a cardholder pre-authenticates a payment account using the present systems, and the physical payment card associated with the payment account is stolen sometime after pre-authentication, payment transactions initiated using the stolen card will not be authorized via pre-authentication after the time window closes. Actual cardholder 114 would have to initiate the pre-authentication process again, and the thief would not be able to do so.

Once the card account has been pre-authenticated, cardholder 114 receives a notification and/or prompt that the card account has been pre-authenticated and a transaction may be conducted. Cardholder then conducts a transaction with a simple merchant 118, for example, by swiping the payment card with the merchant POS device. Simple merchant 118 sends the payment transaction data (e.g., authorization request message) to server 102 via a second computer network 126 (e.g., a payment network), and server 102 processes the authorization request message and transmits the request message via second computer network 126 to a card issuer 120. While server 102 processes the authorization request message, monitoring module 116 identifies the payment transaction as a pre-authenticated payment transaction by performing a lookup and data comparison to data stored within monitor data store 130. Monitoring module 116 of authentication computing device 104 flags the authorization request message by embedding a digital authentication flag within a data field of the authorization request message, and thereby creates an enhanced authorization request message. Server 102 then transmits the enhanced authorization request message to card issuer 120 via second computer network 126, which advises card issuer 120 that the payment account associated with this payment transaction has been pre-authenticated.

In one embodiment, the payment account can only be approved if it has been pre-authenticated in the way described above. Cardholder 114 has the option to restrict all payment transactions that have not been pre-approved by setting a parameter using the digital wallet 122. In another embodiment, the respective card account may still be approved by the card issuer 120 even without pre-authentication. In this embodiment, the card is not restricted to pre-authentication, but the simple merchant 118 may be more cautious and less likely to approve a payment transaction that was not pre-authenticated.

Figure 2:
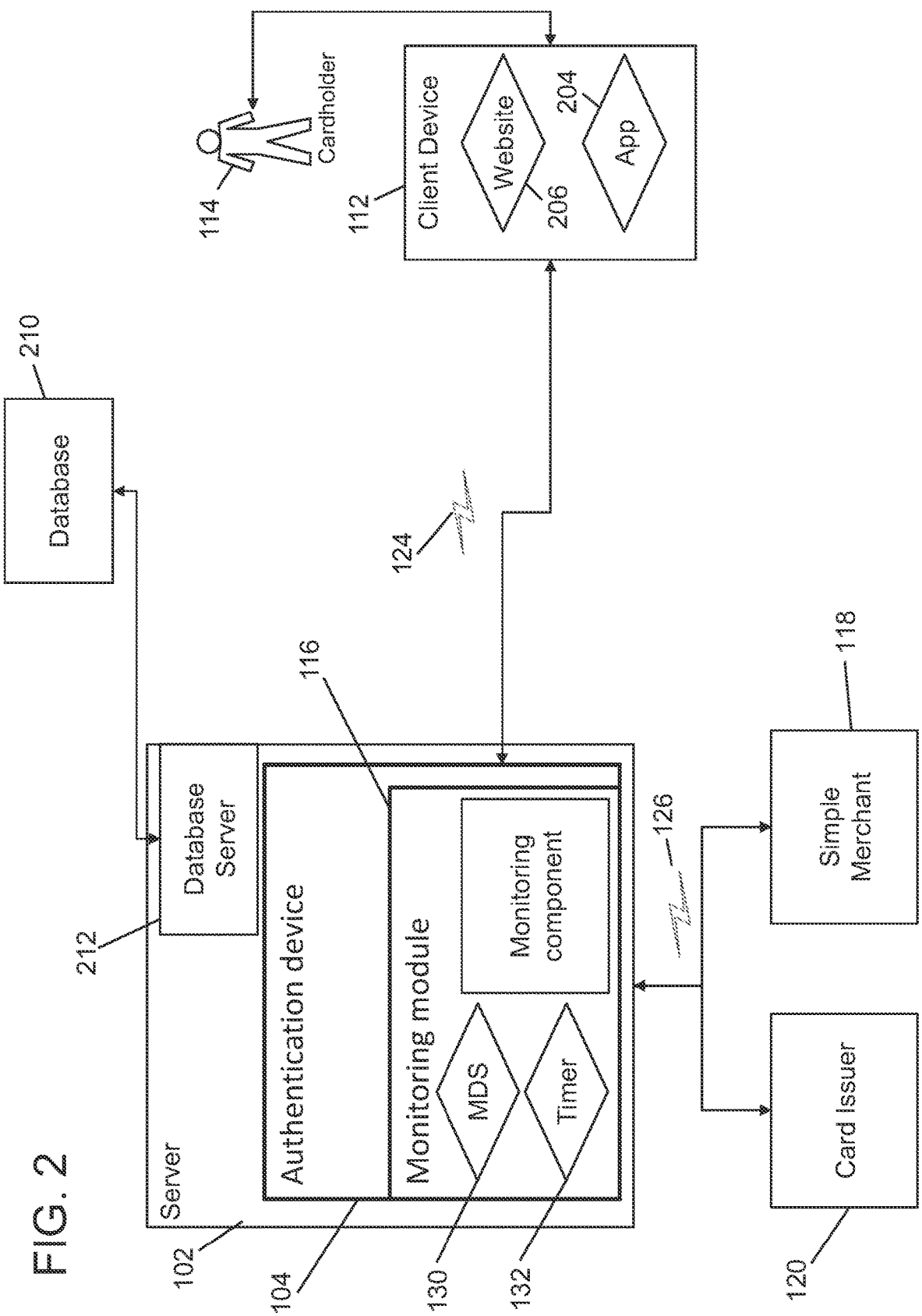
FIG. 2 is a simplified block diagram of the pre-authentication system shown in FIG. 1.

FIG. 2 is a simplified block diagram of the pre-authentication system shown in FIG. 1. Server 102 includes authentication computing device 104 for pre-authenticating the security of a payment transaction. Authentication computing device 104 is in communication with at least one client device 112. As described above, authentication computing device includes monitoring module 116, monitor data store 130, and timer 132. Server 102 may also be associated with the payment processor 128.

In the example embodiment, client device 112 is a mobile device, such as any mobile device capable of interconnecting to the Internet including a web-based phone, also referred to as smart phone, personal digital assistant (PDA), a tablet, or other web-based connectable equipment. In an alternative embodiment, client device 112 is a desktop computer or a laptop computer. Client device may be associated with a cardholder. Client device may be interconnected to the Internet through a variety of interfaces including a network, such as a local area network (LAN) or a wide area network (WAN), dial-in connections, cable modems and special high-speed ISDN lines. In some embodiments, client device 112 includes a software application (i.e., a service app) installed on client device 112. In additional embodiments, client device 112 displays a customized website using a web browser installed on client device 112. In further embodiments, client device 112 is in communication with a geopositioning network to facilitate GPS functionality of client device 112. In the example embodiment, server 102 is associated with payment processor 128. Payment processor 128 and/or card issuer 120 may be part of an interchange network 126.

Server 102 includes a database server 212 connected to a database 210, which contains information on a variety of matters, as described below in greater detail. In one embodiment, database 210 is centralized and stored on server 102. In an alternative embodiment, database 210 is stored remotely from server 102 and may be non-centralized. Database 210 may store transaction data including data relating to merchants, merchant locations, and cardholders 114.

In the example embodiment, server 102 is configured to send and receive transaction data to and from card issuer 120 and merchant 118 via network 126. In another embodiment, server 102 is further configured to receive geolocation data from a geopositioning network (not shown). Geopositioning network may be a component in a larger geopositioning network.

Although only card issuer 120, one cardholder 114, and one client device 112 are illustrated, it should be understood that the system 100 may include any number of card issuers 120, cardholders 114, and/or client devices 112 in communication with server 102.

Figure 3:
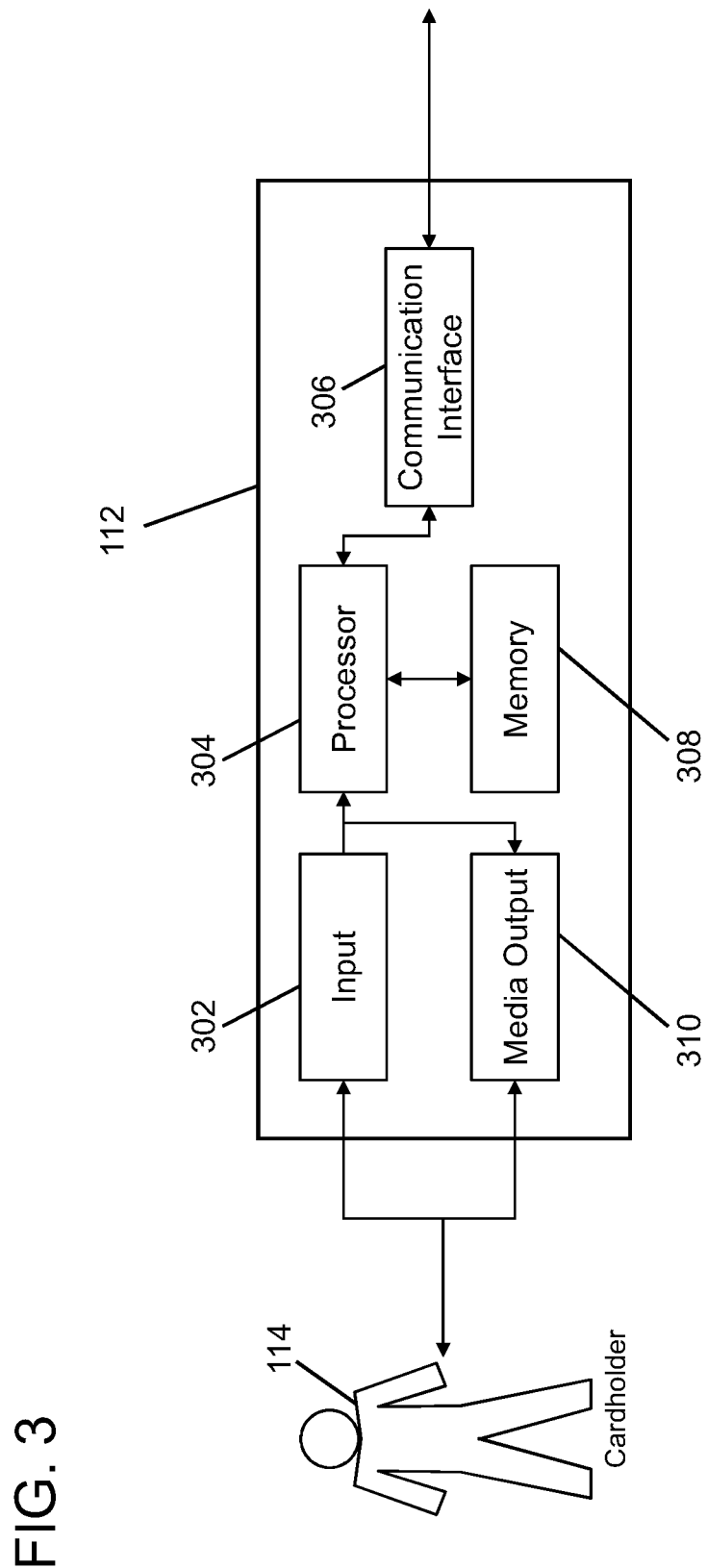
FIG. 3 illustrates an example configuration of a client device as shown in FIG. 1.

FIG. 3 illustrates an example configuration of client device 112 operated by a cardholder 114. Client device 112 may include, but is not limited to, a smart phone, a tablet, and a website. In the example embodiment, client device 112 includes a processor 304 for executing instructions. In some embodiments, executable instructions are stored in a memory area 308. Processor 304 may include one or more processing units, for example, a multi-core configuration. Memory area 308 is any device allowing information such as executable instructions and/or written works to be stored and retrieved. Memory area 308 may include one or more computer readable media.

Client device 112 also includes at least one media output component 310 for presenting information to cardholder 114. Media output component 310 is any component capable of conveying information to cardholder 114. In some embodiments, media output component 310 includes an output adapter such as a video adapter and/or an audio adapter. An output adapter is operatively coupled to processor 304 and operatively couplable to an output device such as a display device, a liquid crystal display (LCD), organic light emitting diode (OLED) display, or "electronic ink" display, or an audio output device, a speaker or headphones.

In some embodiments, client device 112 includes an input device 302 for receiving input from cardholder 114. Input device 302 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 310 and input device 302. Client device 112 may also include a communication interface 306, which is communicatively couplable to a remote device such as the payment processor. Communication interface 306 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 308 are, for example, computer readable instructions for providing a user interface to cardholder 114 via media output component 310 and, optionally, receiving and processing input from input device 302. A user interface may include, among other possibilities, a web browser and client application. Web browsers enable users, such as cardholder 114, to display and interact with media and other information typically embedded on a web page or a website. A client application allows cardholder 114 to interact with a server application from a server system.

In some embodiments, client device 112 includes a global positioning system (GPS) sensor integral with communication interface 306, input device 302, or as a separate component. The GPS sensor is configured to receive signals from a plurality of GPS satellites and to determine the location of the GPS sensor and the mobile device using the signals. More specifically, the GPS sensor determines geolocation information for client device 112. The geolocation information may be calculated, for example, by communicating with satellites using communication interface 306. The GPS sensor determines the location of the mobile device and, therefore, the location of mobile device user (i.e., cardholder 114). For example, the GPS sensor functions as a GPS receiver and receives signals from at least three GPS satellites. The received signals include a time stamp at which the signal was sent and a satellite identifier. The GPS sensor is configured to "reverse engineer" the locations of the GPS satellites and, from the satellites' positions, determine its own location based on how long it took (from the time each signal was sent) to receive each signal. In some cases, the GPS sensor is configured to analyze other data streams to supplement this location-determination process. For example, the GPS sensor may access cellular tower data (e.g., by "pinging" a nearby cell tower) to determine its approximate location and, from that information, only analyze signals from the three nearest GPS satellites. Client device 112 may additionally or alternatively include other components such as an accelerometer, gyroscope, and/or any other position and/or location-determining components. Client device 112 may be used to download a digital wallet system software application in connection with a cardholder account.

Figure 4:
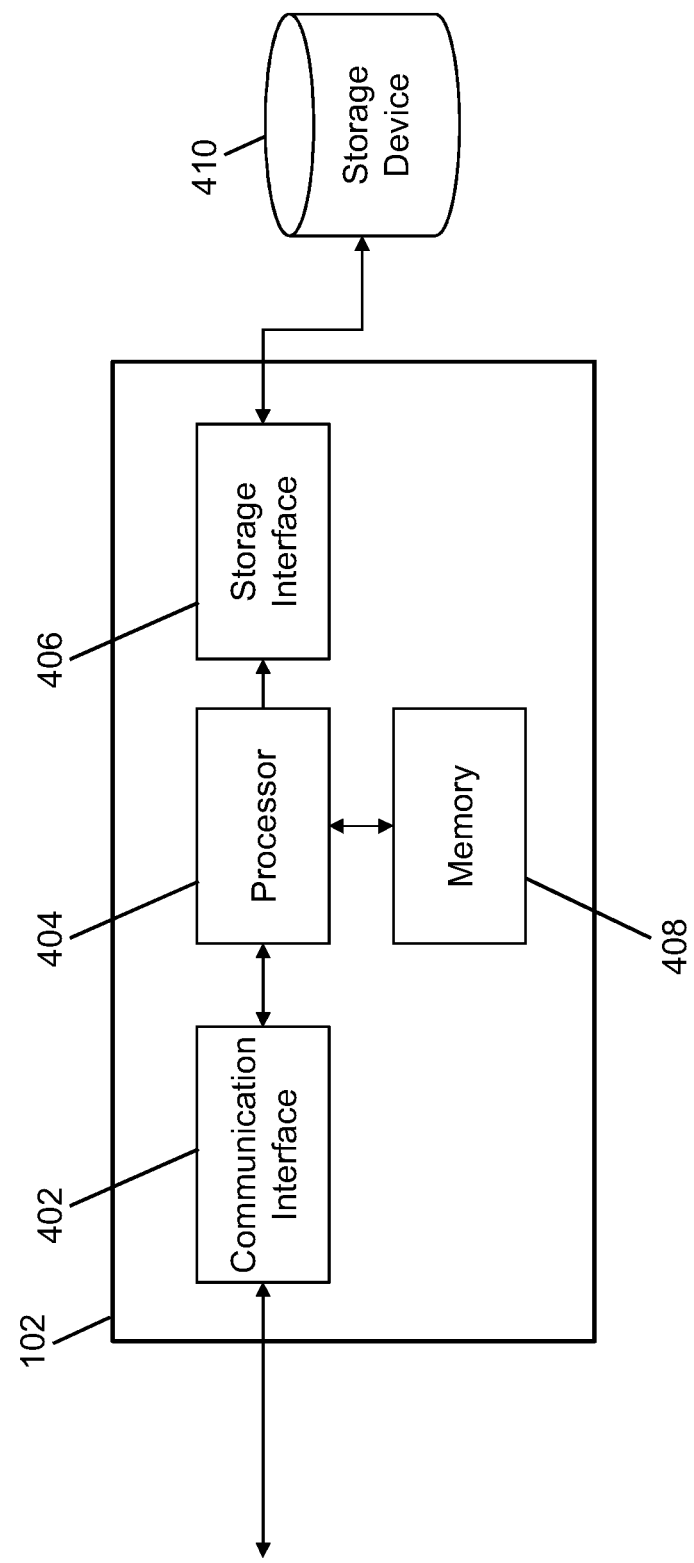
FIG. 4 illustrates an example configuration of a server device as shown in FIG. 1.

FIG. 4 illustrates an example configuration of server 102 as shown in FIG. 1. In the example embodiment, server 102 is associated with payment processor 128, and stores user account data, and sends, receives, and processes signals from various sources. Server may also be authentication computing device 104. Server 102 includes a processor 404 for executing instructions. Instructions may be stored in a memory area 408, for example. Processor 404 may include one or more processing units (e.g., in a multi-core configuration) for executing instructions. The instructions may be executed within a variety of different operating systems on the server 102, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Server 102 is at least one of the payment processor, the card issuer, and/or the merchant.

Processor 404 is operatively coupled to a communication interface 402 such that server 102 is capable of communicating with a remote device such as client device 112 or another server 102.

Processor 404 may also be operatively coupled to a storage device 410. Storage device 410 is any computer-operated hardware suitable for storing and/or retrieving data. In some embodiments, storage device 410 is integrated in server 102. For example, server 102 may include one or more hard disk drives as storage device 410. In other embodiments, storage device 410 is external to server 102 and may be accessed by a plurality of servers 102. For example, storage device 410 may include multiple storage units such as hard disks or solid state disks in a redundant array of inexpensive disks (RAID) configuration. Storage device 410 may include a storage area network (SAN) and/or a network attached storage (NAS) system.

In some embodiments, processor 404 is operatively coupled to storage device 410 via a storage interface 406. Storage interface 406 is any component capable of providing processor 404 with access to storage device 410. Storage interface 406 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 404 with access to storage device 410.

Memory area 408 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
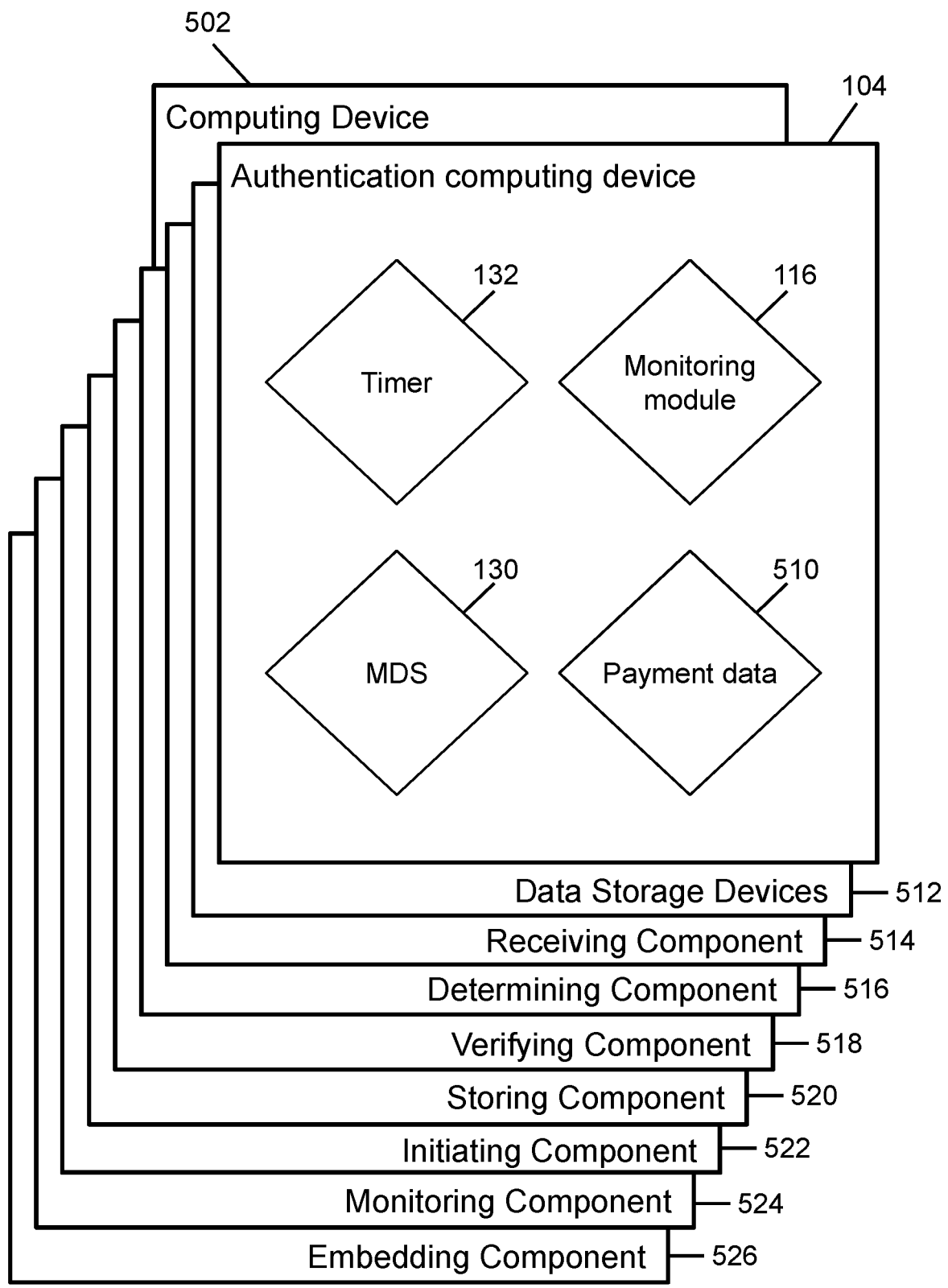
FIG. 5 is a diagram of components of one or more example computing devices that may be used in the system shown in FIG. 1.

FIG. 5 is a diagram of components of one or more example computing devices 502 that may be used in the system shown in FIG. 1. Computing device 502 represents at least authentication computing device 104, which itself may include or be coupled to several separate components within the computing device which perform specific tasks described herein.

In the example embodiment, computing device 502 includes monitor data store 130, monitoring module 116, timer 132, and payment data 510. As described in detail above, monitor data store stores the card account number and/or device metadata, and/or token ID for matching during security verification. Monitoring module 116 is configured to track and monitor payment transactions that are made within the pre-determined amount of time. Timer 132 tracks a length of time the authentication computing device 104 monitors a payment network for a transaction using the account number. Payment data 510 includes, but is not limited to, a shipping address, a credit history, and a billing address.

Computing device 502 further includes storage devices 512. Computing device 502 also includes a receiving component 514 for receiving a pre-authentication signal. Computing device 502 also includes a determining component 516 for determining an account number. Computing device 502 further includes a verifying component 518 configured to verify that a user has satisfied at least one security measure and that the account number is associated with the client device. Computing device 502 further includes a storing component 520 for storing the account number in association with a timer. Computing device 502 further includes an initiating component 522 for initiating the timer. Computing device 502 further includes a monitoring component 524 for monitoring a second computer network to detect an authorization request message for a transaction having the account number, and an embedding component 526 for embedding a digital authentication flag in the authorization request message when the authorization request message is detected before the timer expires.

Figure 6:
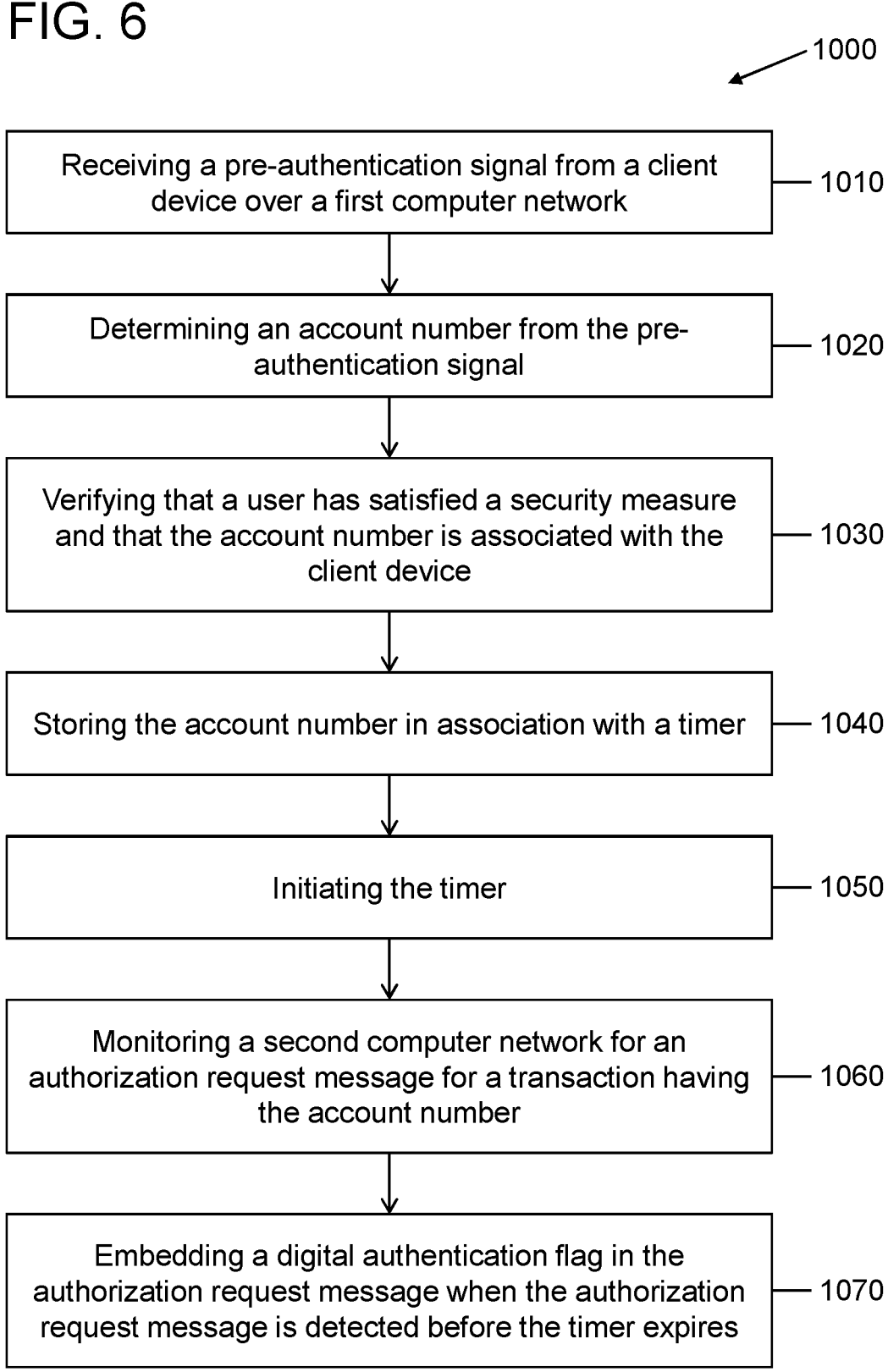
FIG. 6 shows a method for pre-authenticating a user over a network using the pre-authentication system of FIG. 1.

FIG. 6 shows a method 1000 for a pre-authentication of a user over a network. Method 1000 includes receiving 1010, over a first computer network, a pre-authentication signal from a client device operated by the user. Method 1000 further includes determining 1020, from the pre-authentication signal, an account number associated with a payment card of the user. Method 1000 further includes verifying 1030, based on the pre-authentication signal, i) that the user has satisfied at least one security measure, and ii) that the account number is associated with the client device. Method 1000 further includes storing 1040 the account number in a monitor data store, the account number stored in association with a timer that expires after a predetermined length of time. Method 1000 further includes initiating 1050 the timer. Method 1000 further includes monitoring 1060, until the timer expires, a second computer network to detect an authorization request message for a transaction having the account number. Method 1000 further includes embedding 1070 a digital authentication flag in the authorization request message when the authorization request message is detected before the timer expires, the digital authentication flag indicating that the transaction has been pre-authenticated.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for pre-authenticating users over a network, the system comprising:
   an authentication computing device comprising at least one processor configured to:
   pre-authenticate a payment transaction, wherein pre-authenticating the payment transaction comprises:
   subsequent to a token ID provided to a candidate client device, receiving, over a first computer network, a pre-authentication signal initiated by a user directly from the candidate client device, wherein the pre-authentication signal includes (i) the token ID previously provided to the candidate client device, and (ii) a candidate client device identifier identifying the candidate client device;
   determining, by mapping the received token ID to stored account data, that a candidate account number associated with the token ID is embodied on a candidate payment card;
   verifying, based on the pre-authentication signal, that (i) the user has satisfied at least one security measure when initiating the pre-authentication signal, and (ii) the candidate account number is associated with the received candidate client device identifier; and
   initiating a timer after receipt of the pre-authentication signal, the timer associated with the candidate account number and expiring after a predetermined length of time; and generate an enhanced authorization request message, wherein generating the enhanced authorization request message comprises:

monitoring, until the timer expires, a second computer network to detect an authorization request message for a transaction initiated using the candidate account number, the authorization request message generated by a merchant computing device and including the candidate account number, the second computer network being different from the first computer network, the second computer network comprising a proprietary communications standard promulgated by a payment card interchange network for exchange of financial transaction data between financial institutions that are members of the payment card interchange network;

in response to initiating the timer and monitoring the second computer network, detecting the authorization request message including the candidate account number received, via the second computer network, from the merchant computing device associated with the transaction, the authorization request message being compliant with the proprietary communications standard; and embedding, prior to transmitting, via the second computer network, the authorization request message to an issuer computing device associated with the candidate account number, a digital authentication flag in the authorization request message in response to the authentication computing device detecting the authorization request message before the timer expires, the digital authentication flag indicating that the transaction has been pre-authenticated.

2. The system of claim 1, wherein the at least one processor is further configured to receive, from the candidate client device, digital wallet registration data including account data and device metadata, the account data including the account number associated with the candidate payment card, the device metadata including the candidate client device identifier identifying the candidate client device.

3. The system of claim 2, wherein the at least one processor is further configured to:

register, using the digital wallet registration data, the candidate client device within a digital enablement (DE) service associated with the authentication computing device; and store, within a memory device coupled to the at least one processor, the account data and the device metadata included in the digital wallet registration data.

4. The system of claim 3, wherein pre-authenticating the payment transaction further comprises determining that the candidate account number associated with the token ID is embodied on the candidate payment card by mapping the received token ID to the stored device metadata.

5. The system of claim 1, wherein the at least one processor is further configured to:

pre-authenticate the user in response to verifying that (i) the user has satisfied the at least one security measure when initiating the pre-authentication signal, and (ii) the candidate account number is associated with the received candidate client device identifier; and subsequent to pre-authenticating the user, transmit a message to the candidate client device, the message indicating that the user has been pre-authenticated.

6. The system of claim 1, wherein the at least one security measure includes a biometric security measure.

7. The system of claim 1, wherein the token ID is provided to the candidate client device in association with registering the candidate client device within a digital enablement (DE) service associated with the authentication computing device.

8. A computer-implemented method for pre-authenticating users over a network, the method implemented by an authentication computing device including at least one processor, the method comprising:

pre-authenticating a payment transaction, wherein pre-authenticating the payment transaction comprises:

subsequent to a token ID provided to a candidate client device, receiving, over a first computer network, a pre-authentication signal initiated by a user directly from the candidate client device, wherein the pre-authentication signal includes (i) the token ID previously provided to the candidate client device, and (ii) a candidate client device identifier identifying the candidate client device;

determining, by mapping the received token ID to stored account data, that a candidate account number associated with the token ID is embodied on a candidate payment card;

verifying, based on the pre-authentication signal, that (i) the user has satisfied at least one security measure when initiating the pre-authentication signal, and (ii) the candidate account number is associated with the received candidate client device identifier; and initiating a timer after receipt of the pre-authentication signal, the timer associated with the candidate account number and expiring after a predetermined length of time; and generating an enhanced authorization request message, wherein generating the enhanced authorization request message comprises:

monitoring, until the timer expires, a second computer network to detect an authorization request message for a transaction initiated using the candidate account number, the authorization request message generated by a merchant computing device and including the candidate account number, the second computer network being different from the first computer network, the second computer network comprising a proprietary communications standard promulgated by a payment card interchange network for exchange of financial transaction data between financial institutions that are members of the payment card interchange network;

in response to initiating the timer and monitoring the second computer network, detecting the authorization request message including the candidate account number received, via the second computer network, from the merchant computing device associated with the transaction, the authorization request message being compliant with the proprietary communications standard; and embedding, prior to transmitting, via the second computer network, the authorization request message to an issuer computing device associated with the candidate account number, a digital authentication flag in the authorization request message in response to the authentication computing device detecting the authorization request message before the timer expires, the digital authentication flag indicating that the transaction has been pre-authenticated.

9. The computer-implemented method of claim 8 further comprising receiving, from the candidate client device, digital wallet registration data including account data and device metadata, the account data including the account number associated with the candidate payment card, the device metadata including the candidate client device identifier identifying the candidate client device.

10. The computer-implemented method of claim 9 further comprising:
registering, using the digital wallet registration data, the candidate client device within a digital enablement (DE) service associated with the authentication computing device; and
storing, within a memory device coupled to the at least one processor, the account data and the device metadata included in the digital wallet registration data.

11. The computer-implemented method of claim 10 wherein pre-authenticating the payment transaction further comprises determining that the candidate account number associated with the token ID is embodied on the candidate payment card by mapping the received token ID to the stored device metadata.

12. The computer-implemented method of claim 8 further comprising:
pre-authenticating the user in response to verifying that (i) the user has satisfied the at least one security measure when initiating the pre-authentication signal, and (ii) the candidate account number is associated with the received candidate client device identifier; and
subsequent to pre-authenticating the user, transmitting a message to the candidate client device, the message indicating that the user has been pre-authenticated.

13. The computer-implemented method of claim 8, wherein the at least one security measure includes a biometric security measure.

14. The computer-implemented method of claim 8, wherein the token ID is provided to the candidate client device in association with registering the candidate client device within a digital enablement (DE) service associated with the authentication computing device.

15. At least one non-transitory computer-readable storage medium having computer-executable instructions embodied thereon, wherein when executed by at least one processor of an authentication computing device for pre-authenticating users over a network, the computer-executable instructions cause the at least one processor to:
pre-authenticate a payment transaction, wherein pre-authenticating the payment transaction comprises:
subsequent to a token ID provided to a candidate client device, receiving, over a first computer network, a pre-authentication signal initiated by a user directly from the candidate client device, wherein the pre-authentication signal includes (i) the token ID previously provided to the candidate client device, and (ii) a candidate client device identifier identifying the candidate client device;
determining, by mapping the received token ID to stored account data, that a candidate account number associated with the token ID is embodied on a candidate payment card;
verifying, based on the pre-authentication signal, that (i) the user has satisfied at least one security measure when initiating the pre-authentication signal, and (ii) the candidate account number is associated with the received candidate client device identifier; and initiating a timer after receipt of the pre-authentication signal, the timer associated with the candidate account number and expiring after a predetermined length of time; and
generate an enhanced authorization request message, wherein generating the enhanced authorization request message comprises:
monitoring, until the timer expires, a second computer network to detect an authorization request message for a transaction initiated using the candidate account number, the authorization request message generated by a merchant computing device and including the candidate account number, the second computer network being different from the first computer network, the second computer network comprising a proprietary communications standard promulgated by a payment card interchange network for exchange of financial transaction data between financial institutions that are members of the payment card interchange network;
in response to initiating the timer and monitoring the second computer network, detecting the authorization request message including the candidate account number received, via the second computer network, from the merchant computing device associated with the transaction, the authorization request message being compliant with the proprietary communications standard; and
embedding, prior to transmitting, via the second computer network, the authorization request message to an issuer computing device associated with the candidate account number, a digital authentication flag in the authorization request message in response to the authentication computing device detecting the authorization request message before the timer expires, the digital authentication flag indicating that the transaction has been pre-authenticated.

16. The computer-readable storage medium of claim 15, wherein the computer-executable instructions further cause the at least one processor to receive, from the candidate client device, digital wallet registration data including account data and device metadata, the account data including the account number associated with the candidate payment card, the device metadata including the candidate client device identifier identifying the candidate client device.

17. The computer-readable storage medium of claim 16, wherein the computer-executable instructions further cause the at least one processor to:
register, using the digital wallet registration data, the candidate client device within a digital enablement (DE) service associated with the authentication computing device; and
store, within a memory device coupled to the at least one processor, the account data and the device metadata included in the digital wallet registration data.

18. The computer-readable storage medium of claim 15, wherein the computer-executable instructions further cause the at least one processor to:
pre-authenticate the user in response to verifying that (i) the user has satisfied the at least one security measure when initiating the pre-authentication signal, and (ii) the candidate account number is associated with the received candidate client device identifier; and
subsequent to pre-authenticating the user, transmit a message to the candidate client device, the message indicating that the user has been pre-authenticated.

19. The computer-readable storage medium of claim 15, wherein the at least one security measure includes a biometric security measure.

20. The computer-readable storage medium of claim 15, wherein the token ID is provided to the candidate client device in association with registering the candidate client device within a digital enablement (DE) service associated with the authentication computing device.

\* \* \* \* \*